(12) United States Patent
Douguet et al.

(10) Patent No.: US 8,559,625 B2
(45) Date of Patent: Oct. 15, 2013

(54) ELLIPTIC CURVE POINT TRANSFORMATIONS

(75) Inventors: Michel Douguet, Marseilles (FR); Vincent Dupaquis, Biver (FR)

(73) Assignee: Inside Secure, Aix-en-Provence, Cedex (FR)

( * ) Notice: Subject to any disclaimer, the term of this patent is extended or adjusted under 35 U.S.C. 154(b) by 1485 days.

(21) Appl. No.: 11/835,292

(22) Filed: Aug. 7, 2007

(65) Prior Publication Data

US 2009/0041229 A1 Feb. 12, 2009

(51) Int. Cl.
*G06F 21/00* (2013.01)

(52) U.S. Cl.
USPC .................. 380/28; 380/30; 380/44; 380/225; 708/401; 708/492

(58) Field of Classification Search
USPC ......................................................... 380/28
See application file for complete search history.

(56) References Cited

U.S. PATENT DOCUMENTS

| | | | |
|---|---|---|---|
| 6,366,673 B1 | 4/2002 | Hollmann et al. | |
| 6,466,959 B2 | 10/2002 | Blake et al. | |
| 6,873,706 B1 | 3/2005 | Miyazaki et al. | |
| 6,876,745 B1 | 4/2005 | Kurumatani | |
| 6,910,058 B2 * | 6/2005 | Futa et al. | 708/491 |
| 7,031,468 B2 | 4/2006 | Hoffstein et al. | |
| 7,046,801 B2 | 5/2006 | Okeya | |
| 7,110,538 B2 | 9/2006 | Gallant et al. | |
| 7,162,033 B1 | 1/2007 | Coron | |
| 7,450,720 B2 * | 11/2008 | Roelse | 380/259 |
| 7,639,808 B2 * | 12/2009 | Izu et al. | 380/255 |
| 2003/0156714 A1 | 8/2003 | Okeya | |
| 2004/0228478 A1 | 11/2004 | Joye | |
| 2005/0105723 A1 | 5/2005 | Dupaquis et al. | |
| 2005/0152541 A1 | 7/2005 | Takenaka et al. | |
| 2005/0169462 A1 | 8/2005 | Jung et al. | |
| 2005/0195973 A1 | 9/2005 | Ibrahim | |
| 2006/0029221 A1 | 2/2006 | Ibrahim | |
| 2006/0029222 A1 | 2/2006 | Lambert et al. | |
| 2006/0045262 A1 | 3/2006 | Orlando | |
| 2006/0093137 A1 | 5/2006 | Izu et al. | |
| 2006/0098814 A1 | 5/2006 | Al-Khoraidly et al. | |
| 2006/0280296 A1 | 12/2006 | Vasyltsov et al. | |

(Continued)

FOREIGN PATENT DOCUMENTS

WO WO 2006/124160 11/2006

OTHER PUBLICATIONS

Cohen, Henri, Atsuko Miyaji, and Takatoshi Ono. "Efficient Elliptic Curve Exponentiation Using Mixed Coordinates." Advances in Cryptography—ASIACRYPT'98, Lecture Notes in Computer Science vol. 1514, 1998, pp. 51-65.*

(Continued)

*Primary Examiner* — Taghi Arani
*Assistant Examiner* — Narciso Victoria
(74) *Attorney, Agent, or Firm* — Panitch Schwarze Belisario & Nadel LLP

(57) ABSTRACT

In an elliptic curve cryptographic system, point coordinates in a first coordinate system are transformed into a second coordinate system. The transformed coordinates are processed by field operations, which have been modified for operating on the transformed point coordinates. In some implementations, the point coordinates are transformed using a linear transformation matrix having coefficients. The coefficients can be fixed, variable or random. In some implementations, the transformation matrix is invertible.

21 Claims, 5 Drawing Sheets

(56) References Cited

U.S. PATENT DOCUMENTS

| | | | |
|---|---|---|---|
| 2007/0055879 | A1 | 3/2007 | Luo et al. |
| 2007/0064931 | A1 | 3/2007 | Zhu et al. |
| 2007/0083586 | A1 | 4/2007 | Luo et al. |
| 2007/0162530 | A1 | 7/2007 | Dhem |
| 2007/0177721 | A1 | 8/2007 | Itoh et al. |
| 2008/0019509 | A1 | 1/2008 | Al-Gahtani et al. |
| 2008/0025500 | A1 | 1/2008 | Izu et al. |
| 2008/0095357 | A1 | 4/2008 | Kitamura et al. |
| 2008/0205638 | A1 | 8/2008 | Al-Gahtani et al. |
| 2008/0273695 | A1 | 11/2008 | Al-Gahtani et al. |
| 2009/0010428 | A1* | 1/2009 | Delgosha et al. ............... 380/30 |
| 2009/0074179 | A1 | 3/2009 | Futa et al. |
| 2009/0180611 | A1 | 7/2009 | Douguet et al. |

OTHER PUBLICATIONS

Chevallier-Mames, "Self-Randomized Exponentiation Algorithms", 2004.
Joye, et al., "The Montgomery Powering Ladder", 2003.
Bernstein, D.J. et al., "Performance evaluation of a new coordinate system for elliptic curves", May 22, 2007.
Cohen et al., "Efficient Elliptic Curve Exponentiation Using Mixed Coordinates." Internat. Conf. on the Theory and Appl. Of Cryptology and Infor. Security, pp. 51-65, 1988.
Coron, J.-S. "Resistance Against Differential Power Analysis for Elliptic Curve Crytosystems." Cryptographic Hardware and Embedded Sys. Computer Sci., 1717, pp. 292-302,1999.
Crandall J. & Papadopoulos J. (2003) "On the implementation of AKS-class primality tests". Retrieved from internet <URL http://www.apple.com/acg/pdf/aks3.pdf>.
Dhem, J-F, "Design of an Efficient Public-Key Cryptographic Library for RISC-based Smart Cards", (May 1, 2008), Chapter 2, pp. 11-56.
Deschamps, J-P. and Sutter, G. (2007) "Comparison of FPGA Implementation of the Mod $M$ Reduction." Latin American Applied Research, pp. 93-97.
Dupuy, W. & Kunz-Jacques, S. "Resistance of Randomized Projective Coordinates Against Power Analysis." DCSSI Crypto Lab, (27 pages) 2005.
Efficient Implementation USC Computer Science Department, unknown date.
Hasenplaugh, W., et al. (2007) "Fast Modular Reduction". Gunnar Gaubatz, Vinodh Gopal; pp. 225-229, $18^{th}$ IEEE Symposium on Computer Arithmetic.
Joye et al., "Protections Against Differential Analysis for Elliptic Curve Cryptography—An Algebraic Approach-." Cryptographic Hardware & Embedded Sys., 377-390, 2001.
Joye "Elliptic Curves and Side-Channel Attacks" Séminaire de Cryptographic, Rennes, 1-7, 2003 [on-line]. [Retrieved from the internet <URL http://www.gemplus.com/smart/>.
Okeya and Sakurai, "Power Analysis Breaks Elliptic Curve Cryptosystems Even Secure Against the Timing Attack." Prog in Cryptology-Indocrypt, Inter Conf Incrypt, 178-190, 2000.
Phatak, D. et al., "Fast Modular Reduction for Large Wordlengths via One Linear and One Cyclic Convolution." *Computer Arithmetic*, $17^{th}$ IEEE, (Jun. 27, 2005), pp. 179-183.
International Search Report and the Written Opinion for PCT Application No. PCT/US2009/030869 dated May 8, 2009, 14 pages.
Notification Concerning Transmittal of International Preliminary Report on Patentability for PCT/US2009/030867, filed Jul. 29, 2010, 7 pages.

* cited by examiner

ELLIPTIC CURVE POINT TRANSFORMATIONS

TECHNICAL FIELD

The subject matter of this application is generally related to elliptic curve cryptography (ECC).

BACKGROUND

ECC systems are subject to "side-channel" attacks (e.g., power analysis attacks, differential power analysis) that exploit information leaked into the operating environment of a device while the device executes cryptographic algorithms. For example, a hacker may monitor the power consumed or the electromagnetic radiation emitted by a device (e.g., a smart card), while it performs private-key operations such as decryption and signature generation. The hacker may also measure the time it takes to perform a cryptographic operation, or analyze how a cryptographic device behaves when certain errors are encountered. Some conventional countermeasures to side-channel attacks insert "dummy" cryptographic operations (e.g., doubling, addition), so that the operations cannot be distinguished from each other when viewed on a power trace, for example. Inserting additional "dummy" operations, however, slows down the overall cryptographic process, which may be unacceptable for certain applications.

SUMMARY

In an elliptic curve cryptographic system, point coordinates are transformed from a first coordinate system to a second coordinate system. The transformed coordinates are processed by field operations, which have been modified for operating on the transformed point coordinates. In some implementations, the point coordinates are transformed using a linear transformation matrix having coefficients. The coefficients can be fixed, variable or random. In some implementations, the transformation matrix is invertible.

In some implementations, a method includes: obtaining input specifying one or more point coordinates; transforming at least one point coordinate from a first coordinate system to a second coordinate system using a transformation having coefficients; and performing one or more field operations on the transformed point coordinate.

In some implementations, a method includes: obtaining a point on an elliptic curve; transforming the point from a first coordinate system to a second coordinate system; and generating ciphertext or a digital signature using the transformed point in combination with at least one field operation.

In some implementation, a method includes: obtaining ciphertext generated using a point on an elliptic curve; obtaining the point from the ciphertext; transforming the point from a first coordinate system to a second coordinate system; and generating a plaintext message using the transformed point in combination with at least one field operation.

In some implementations, a method includes: obtaining a digital signature, the digital signature generated using a point on an elliptic curve; obtaining the point from the digital signature; transforming the point from a first coordinate system to a second coordinate system; and authenticating the digital signature using the transformed point in combination with at least one field operation.

In some implementations, an apparatus includes an interface operable for obtaining one or more point coordinates. An encryption engine is coupled to the interface and operable for transforming at least one point coordinate on an elliptic curve from a first coordinate system to a second coordinate system, and for performing one or more field operations on the transformed point coordinate.

In some implementations, an apparatus includes an interface operable for obtaining a point on an elliptic curve. An encryption engine is coupled to the interface and operable for transforming the point from a first coordinate system to a second coordinate system, and for generating ciphertext or a digital signature using the transformed point in combination with at least one field operation.

In some implementations, an apparatus includes an interface operable for obtaining ciphertext generated using a point on an elliptic curve. A decryption engine is coupled to the interface and operable for obtaining the point from the ciphertext, transforming the point from a first coordinate system to a second coordinate system, and generating a plaintext message using the transformed point in combination with at least one field operation.

In some implementations, an apparatus includes an interface operable for obtaining a digital signature, the digital signature generated using a point on an elliptic curve. A decryption engine is coupled to the interface and operable for obtaining the point from the digital signature, transforming the point from a first coordinate system to a second coordinate system, and for authenticating the digital signature using the transformed point in combination with at least one field operation.

Other implementations of elliptic curve point transformations are disclosed, including implementations directed to systems, methods, processes, apparatuses and computer-readable mediums.

DETAILED DESCRIPTION

Example Cryptographic System & Process

Figure 1:
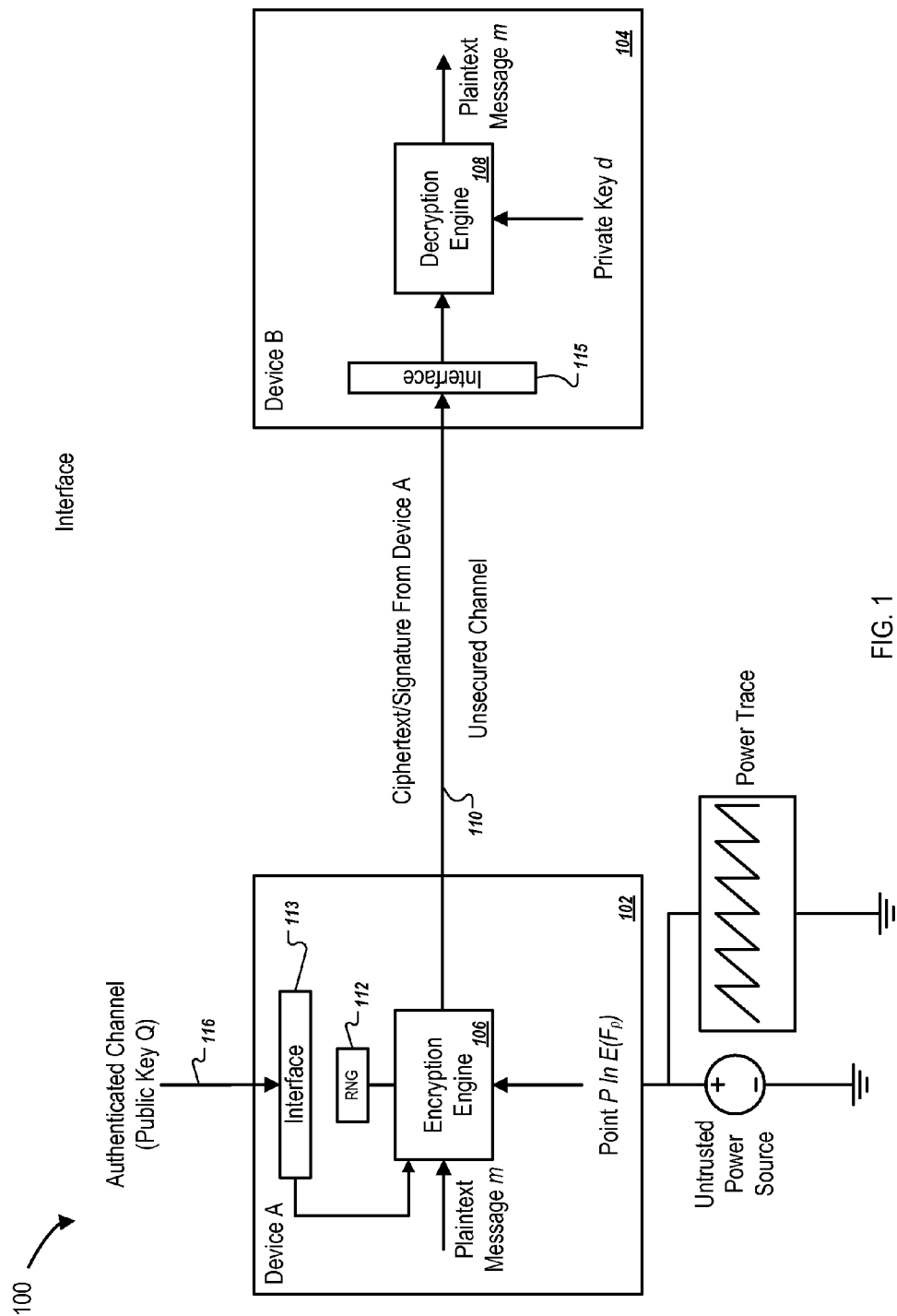
FIG. 1 is a block diagram of an implementation of a public-key cryptographic system.

FIG. 1 is a block diagram of an implementation of a public key cryptographic system 100. The system 100 includes device 102 ("Device A") and device 104 ("Device B"). In the example shown, device 102 can communicate with device 104 over an unsecured channel 110 and an interface 113. For example, device 102 can send a message or digital signature over the unsecured channel 110 to device 104. Devices 102 and 104 can be any device capable of performing cryptographic processes, including but not limited to: a personal computer, a mobile phone, an email device, a game console, a personal digital assistant (PDA), a media player, a storage device, etc. An unsecured channel 110 can be any communication medium, including but not limited to: radio frequency (RF) carriers, optical paths, circuit paths, networks (e.g., the Internet), etc.

In some implementations, the device 102 includes an encryption engine 106 and a random number generator 112.

The random number generator can generate true random numbers (e.g., generated from a physical process) or pseudo random numbers (e.g., generated from an algorithm). In other implementations, the random numbers are received through the interface 113 or are stored on the device 102 (e.g., in memory).

In some implementations, the device 104 includes a decryption engine 108 for decrypting ciphertext or digital signatures received from device 102 through interface 115. The devices 102 and 104 can include both encryption and decryption engines, 106, 108, for bidirectional communication. In the example shown, the devices 102, 104, can perform a variety of cryptographic processes, including but not limited to: elliptic curve encryption/decryption, elliptic curve digital signature generation and authentication, etc. Although the cryptographic processes described herein are related to elliptic curves, the disclosed implementations can be used with any cryptographic processes that perform field operations where it is desirable to mask secret material that could be derived from analyzing the operating environment of the field operations.

In some implementations, the same domain parameters (e.g., selected curve, group order, etc.) are shared by both devices 102, 104.

In some implementations, device 102 can be a smart card that is in the process of authenticating its holder to device 104, which can be a mainframe computer located at a bank, for example. A smart card, which may also be referred to as a chip card or an integrated circuit card (ICC), is a pocket sized card (e.g., a credit card sized card) that can include embedded integrated circuits that hold and/or process information. The smart card may also include specific security logic. The stored and/or processed information can be secure information specific to its holder (e.g., a bank account number) that can be used to process a requested transaction by the user (e.g., a withdrawal from their bank account). The security logic can be used to protect the transmission of the user specific information between device 102 and device 104.

In some cases, a hacker may monitor the communications between device 102 and device 104 by eavesdropping on the unsecured channel 110. The hacker may have the capability to read all data transmitted over the channel, to modify transmitted data, and to inject other data into the transmission for their own benefit. For example, the hacker may attempt to read a message from sending device 102 to receiving device 104 to obtain personal information about the sender of the message (e.g., bank account number, credit card number). The hacker may also attempt to impersonate either device 102 or device 104 in the communication channel to perform certain activities that would be requested or performed by either device (e.g., withdraw money from a bank account, order merchandise to be charged to a credit card).

In other cases, a hacker may try to analyze the operating environments of the devices 102 and 104 to determine secret keying material. These attacks are often referred to as "side-channel" attacks. Some examples of side-channel attacks include power analysis attacks (e.g., simple or differential) and electromagnetic analysis attacks.

Power analysis attacks measure power consumption of a cryptographic device, such as a smart card that draws power from an external, untrusted source. Secret keying material can be determined directly by examining a power trace from a single secret key operation. Elliptic curve point multiplication algorithms are particularly vulnerable to these types of attacks because formulas for adding and doubling points may have power traces which can be distinguished from other operations.

Electromagnetic analysis attacks measure electromagnetic (EM) signals induced by the flow of current through CMOS devices, which can be collected by placing a sensor close to the device while the device is performing cryptographic operations. The EM signals can be analyzed to determine which instructions are being executed and contents of data registers.

Therefore, a need may arise for secure communications between device 102 and device 104, and for securing the operating environments of devices 102 and 104. The former can be defended against using known encryption techniques. The latter can be defended against using elliptic curve point transformations, used alone or combined with exponent masking and additive exponent decomposition techniques, as described in reference to FIGS. 2-4.

Elliptic Curve Key Generation

In some implementations, cyclic subgroups of elliptic curve groups that form an additive abelian group can be used to implement the public key cryptographic system 100 based on a discrete logarithm problem. In this implementation, an elliptic curve, E, can be defined over a finite field of integers, $F_p$. A point, P, in $E(F_p)$ can have a prime order, n. The cyclic subgroup of $E(F_p)$ generated by point P can be defined by the following equation:

$$(P)=\{O, P, 2P, 3P \ldots (n-1)P\},$$

where O is the point at infinity and the identity element.

In this implementation, the prime number, p, the equation of the elliptic curve, E, (e.g., the values of a and b in equation $y^2=x^3+ax+b$), the point, P, and the order, n, can be the public domain parameters. A private key, d, can be a random integer selected from the interval [1, n−1], and a corresponding public key, Q, can be calculated as: Q=d·P, where point, P, is multiplied by the private key, d, an integer, using elliptic curve point multiplication, which can be denoted by the operator "·". For example, let A be a point on an elliptic curve. An integer, j, can be multiplied with the point A to obtain another point B on the same elliptic curve. Point multiplication can be represented by the equation: B=j·A. In some implementations, point multiplication can be performed using point addition and point doubling repeatedly to find the result. For example, if j=23, then j·A=23·A=2 (2(2(2*A)+A)+A)+A, where "*" represents integer multiplication.

The problem of determining the private key, d, given the domain parameters (p, E, P, and n) and public key, Q, is referred to as the elliptic curve discrete logarithm problem (ECDLP).

Examples of Elliptic Curve Cryptographic Processes

Techniques will now be described for performing elliptic curve point transformations in well-known elliptic curve cryptographic processes. These techniques, however, can be used in any cryptographic processes or applications where it is desirable to mask secret keying material.

ElGamal Cryptographic Processes

In some implementations, the public key cryptographic system 100 can use an elliptic curve analogue of ElGamal encryption and decryption processes. For example, a public key, Q, can be the public key of device 104, the receiving device. Device 102, the sending device, can acquire the public key, Q, from device 104 over authenticated channel 116. A plaintext message m can be represented as a point, M, in a finite field of integers $E(F_p)$. Encryption engine 106 can compute ciphertext $C_1$, where $C_1$ is a point on $E(F_p)$, using the following equation:

$$C_1 = k \cdot P,$$

where k is a random number selected by device 102 from the interval [1, (n−1)], and P is a point in $E(F_p)$ and is a domain parameter.

Encryption engine 106 can also compute ciphertext $C_2$, where $C_2$ is a point in $E(F_p)$, using the following equation:

$$C_2 = M + k \cdot Q,$$

where M is the point representation of the plaintext message m, k is a random number selected by device 102 from the interval [1, (n−1)], and Q is the point representation of the public key of device 104, where point Q is in $E(F_p)$.

The ciphertext pair of points $(C_1, C_2)$ can be transmitted by device 102 to device 104 over unsecured channel 110. Device 104, using decryption engine 108 and its private key d, can recover the plaintext message m from the ciphertext pair of points $(C_1, C_2)$ using the following equation:

$$M = C_2 - d \cdot C_1,$$

where M is the point representation of the plaintext message m, d is the private key of device 104, and plain text message m can be extracted from M.

A hacker analyzing the operating environments of the devices 102, 104 would need to compute $k \cdot Q$, since $d \cdot C_1 = k \cdot Q$. The task of computing $k \cdot Q$ from the domain parameters (e.g., p, E, P, n), public key Q, and $C_1 = k \cdot P$ can be referred to as the elliptic curve analogue of the Diffie-Hellman problem. Since Q is a public domain parameter, the hacker need only determine the exponent k from the operating environment to recover the plaintext message m. Thus, it is desirable to protect the exponent k from side-channel attacks.

Elliptic Curve Point Operations

One of the main operations in elliptic curve cryptography can be point multiplication. As previously described, a point multiplication operation can be performed using point addition and point doubling operations repeatedly to find the result. Each point addition and point doubling operation can include a multiplicative inverse operation. In some implementations, the inverse operation can have an execution speed orders of magnitude slower than an addition or multiplication operation. In some implementations, representing points in a projective coordinate system can eliminate the use of the multiplicative inverse operation in point addition and point doubling operations. This can result in an increase in the efficiency of the point multiplication operation.

Coordinate Systems In Elliptic Curve Cryptography

An elliptic curve can be represented with respect to more than one coordinate system. In some implementations, points on an elliptic curve can be represented in the affine coordinate system. In some implementations, points on an elliptic curve can be represented in a projective coordinate system, which will be described in more detail below. In some implementations, points on an elliptic curve can be represented in a redundant coordinate system, where additional coordinates can be included with the point coordinates in an affine or projective coordinate system.

For example, a point on an elliptic curve, P, represented by affine coordinates (e.g., x1, y1), can be converted to projective coordinates (e.g., x1, y1, z1) in a projective coordinate system. A point multiplication operation can be performed on point P, and when complete, point P can be converted back to affine coordinates.

In some implementations, points on an elliptic curve on a binary field ($F_2^m$) can be represented by projective coordinates. For example, the point (x, y, z) in projective coordinates can correspond to the point $(x/z, y/z^2)$ in affine coordinates. The equation for the elliptic curve on a binary field represented in projective coordinates can be:

$$y^2 + xyz = x^3z + ax^2z^2 + bz^4.$$

For a point multiplication operation, the point (x, y) in affine coordinates can be converted to the point (x, y, 1) in projective coordinates. After a point multiplication operation, the result (x, y, z) can be converted back to affine coordinates as $(x/z, y/z^2)$ where z is not equal to zero. If z=0, the point can then be considered as the point at infinity, O.

In some implementations, points on an elliptic curve in a prime field ($F_p$) can be represented by Jacobian projective coordinates. For example, the point (x, y, z) in Jacobian projective coordinates can correspond to the point $(x/z^2, y/z^3)$ in affine coordinates. The equation of an elliptic curve on a prime field represented in Jacobian projective coordinates can be:

$$y^2 = x^3z - 3 \cdot xz^4 + bz^6.$$

For a point multiplication operation, the point (x, y) in affine coordinates can be converted to the point (x, y, 1) in Jacobian projective coordinates. After point multiplication, the result (x, y, z) can be converted back to affine coordinates as $(x/z^2, y/z^3)$ where z is not equal to zero. If z=0, the point can then be considered as the point at infinity, O.

In some implementations, points on an elliptic curve in a prime field ($F_p$) can be represented by redundant coordinates. For example, the point (x, y, z, $z^2$, $z^3$) in Chudnovsky projective coordinates can correspond to the point $(x/z^2, y/z^3)$ in affine coordinates. The equation of an elliptic curve on a prime field represented in Chudnovsky projective coordinates can be:

$$y^2 = x^3z - 3 \cdot xz^4 + bz^6.$$

For a point multiplication operation, the point (x, y) in affine coordinates can be converted to the point (x, y, 1) in Chudnovsky projective coordinates. After a point multiplication operation, the result (x, y, z) can be converted back to affine coordinates as $(x/z^2, y/z^3)$ where z is not equal to zero. If z=0, the point can then be considered as the point at infinity, O.

Elliptic Curve Point Transformation Process

Figure 2:
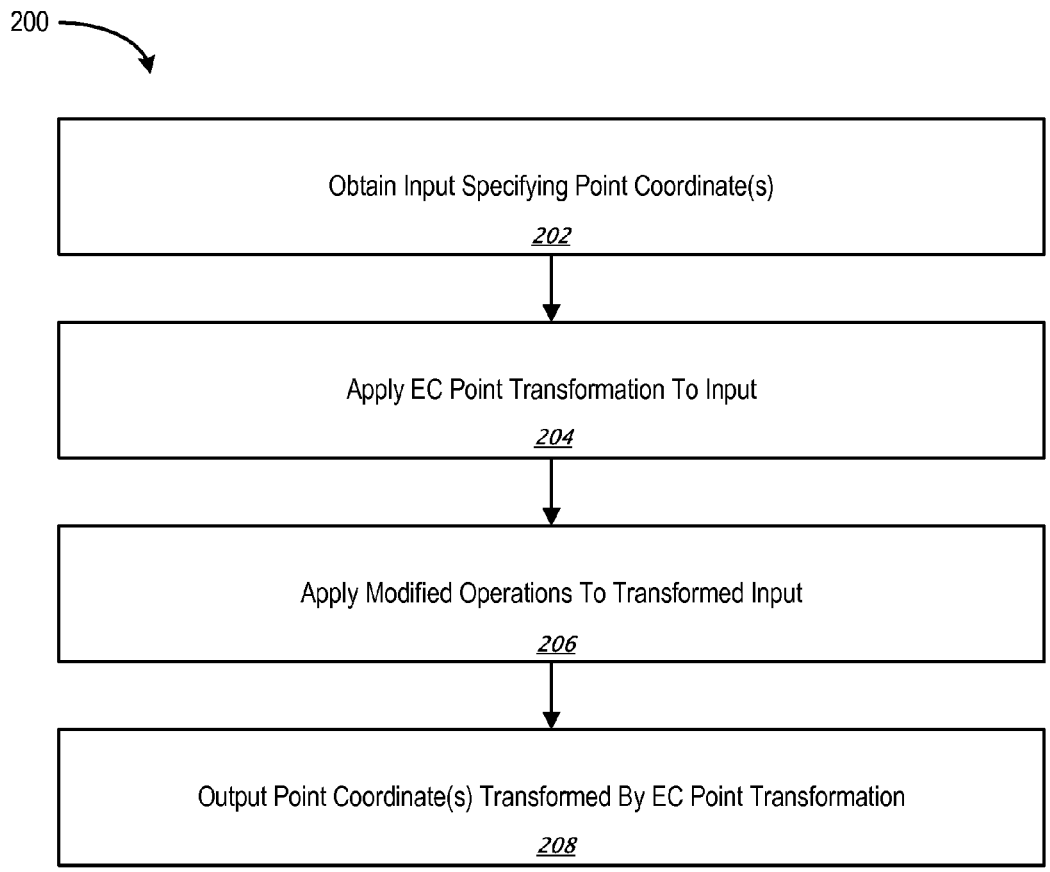
FIG. 2 is a flow diagram of an implementation of an elliptic curve point transformation process.

FIG. 2 is a flow diagram of an implementation of an elliptic curve point transformation process 200. The process 200 can transform point coordinates on an elliptic curve when performing point operations, which can include, but are not limited to, point multiplication, point addition, and point doubling. The process 200 can be performed on elliptic curves on a prime field ($F_p$), a binary field ($F_2^m$), and an extension field ($F_p^m$).

A point P on an elliptic curve can be represented in affine coordinates (e.g., P=(x, y)). In some implementations, a point P can also be represented in projective coordinates, where the affine point P=(x, y) can be represented with powers c and d that can define an equivalence class. For example, class (x:y:z)=$\{(a^c)*x, (a^d)*y, a*z\}$. In some implementations, a point P can also be represented in redundant coordinates, for example Chudnovsky projective coordinates, where the point P can be represented by coordinates $(x, y, z, z^2, z^3)$.

The point transformation process 200 can perform a linear matrix transformation on the coordinates of point P. The linear matrix transformation can include fixed, variable, or random coefficients. The transformation can change the intermediate coordinate values for a point P during point operations. Dependent upon the implementation, the point transformation can be combined with the transformation of a point P from affine coordinates to projective coordinates, the transformation of a point P from affine coordinates to redundant coordinates, or the point transformation can be performed on affine coordinates.

In some implementations, the linear transformation matrix can include coefficients in the underlying field of the elliptic curve. As was described above, the elliptic curve can be on a prime field ($F_p$), a binary field ($F_{2^m}$), or an extension field ($F_p^m$). In some implementations, the linear transformation matrix can be a square matrix (the number of rows in the matrix are equal to the number of columns in the matrix). The square matrix can be invertible. For example, an n row by n column square matrix A can be referred to as invertible if there exists matrix B such that $$AB=BA=I_n,$$

where $I_n$ denotes the n-by-n identity matrix.

The multiplication used can be matrix multiplication. The matrix B can be determined by the matrix A and is therefore the inverse of matrix A. In some implementations, the linear transformation matrix coefficients can be chosen randomly. In other implementations, the coefficients can be chosen to minimize the complexity of the matrix multiplication.

The elliptic curve point transformation process 200 can be performed one or multiple times during a point operation (e.g., a point multiplication operation that can include point addition and point doubling). The elliptic curve point transformation process 200 can change the coordinates of the point P at a certain step in a point operation. The linear transformation matrix can modify the calculations used in the point operation. Therefore, the point operations can be modified to produce the correct results in affine coordinates, or projective or redundant coordinates if they were used.

In some implementations, the elliptic curve point transformation process 200 can be performed on an elliptic curve represented in affine coordinates. In this implementation, the linear transformation matrix can be a 2×2 square matrix. For example, a point P can have the coordinates (x, y) on an elliptic curve on a prime field ($F_p$). A linear transformation matrix, M, can be:

$$M = \begin{bmatrix} b & b-1 \\ 1 & 1 \end{bmatrix},$$

where b can be a constant, a function of random values, or available data in the point calculation.

The determinate of the square matrix M, (det(M)), can be a scalar associated with the matrix M. In this example, $$det(M)=b*1-((b-1)*1)=1.$$

The transformed point, P', can have the coordinates (x',y'). The transformed point, P', can be calculated as:

$$P=M*P,$$

$$P'=((b*x)+(b-1)*y, x+y)=(x'/y'),$$

using matrix multiplication.

The inverse transformation of point P', which results in the point P, can be calculated as:

$$P(x'-(b-1)y', b*y'-x')=(x,y),$$

using matrix multiplication.

For example, setting b=2 in the above implementation can result in the following values for matrix M, det(M), point P, point P', and the inverse transformation of point P'.

$$det(M) = b*1-((b-1)*1) = (2-((2-1)*1) = 1,$$

$$M = \begin{bmatrix} b & b-1 \\ 1 & 1 \end{bmatrix} = \begin{bmatrix} 2 & 1 \\ 1 & 1 \end{bmatrix},$$

$$P' = M*P,$$

$$P' = ((2*x)+(2-1)*y, x+y) = (2*x+y, x+y) = (x', y').$$

The inverse transformation of point P', which results in the point P, can be calculated as:

$$P=(x'-(2-1)y', 2*y'-x')=(x'-y', 2*y'-x')=(x, y).$$

Continuing with the above example, an operation on point coordinates can be a point addition operation on points represented in affine coordinates. The operation on points coordinates can be the addition of a point P and a point Q which results in a point R, where points P, Q, and R are points on an elliptic curve on a prime field ($F_p$).

$$P=(x1, y1),$$

$$Q=(x2, y2),$$

$$R=(x3, y3)=P+Q.$$

Point, P, can be transformed using a matrix, M, as described in the previous examples, where $$M = \begin{bmatrix} 2 & 1 \\ 1 & 1 \end{bmatrix},$$

$$P' = (x1', y1')M*P.$$

The operation on points coordinates using the points P and Q can result in:

$$m=(y1-y2)/(x1-x2),$$

$$x3=m^2-x1-x2,$$

$$y3=m*(x1-x3)-y1.$$

A modified operation on points coordinates using the points P', and Q, can result in:

$$m=(2*y1'-x1'-y2)/(x1'-y1'-x2),$$

$$x3=m^2-x1'-y1'-x2,$$

$$y3=m*(x1'-y1'-x3)-2*y1'+x1'.$$

In this example, the modified operation on points coordinates may be implemented so that the values (x1=x1'-y1') and (y1=2*y1'-x1') are not calculated during the point addition operation. This can result in the following calculations:

$$m=(2*y1'-y2-x1')/(x1'-x2-y1'),$$

$$x3=m^2-x1'-x2-y1',$$

$$y3=x1'+m*(x1'-x3-y1')-2*y1.$$

In another example, an elliptic curve point transformation process 200 can be performed on the output point, R. The output point, R, can be transformed to the output point, R', using the same matrix, M, as was used for the transformation of the point, P:

$$R'=(2*x3+y3, x3+y3)=(x3', y3').$$

In this example, a modified operation on points coordinates can be performed as follows:

$$m=(2*y1'-y2-x1')/(x1'-x2-y1'),$$

$$x3'=2*m^2+m*(x1'-x3-y1')-x1'-4*y1'-2*x2,$$

$$y3'=m2+m*(x1'-x3-y1')-3*y1'+x2.$$

In the above example, the modified operation on points coordinates can be implemented so that the values (x1=x1'−y1'), (y1=2*y1'−x1'), x3, and y3 are not calculated during the point addition operation.

In some implementations, the elliptic curve point transformation process 200 can be performed on an elliptic curve represented in projective coordinates. In this implementation, the linear transformation matrix can be a 3×3 square matrix. For example, a point P can have the coordinates (x, y, z) on an elliptic curve on a prime field ($F_p$). A linear transformation matrix, M, can be:

$$M = \begin{bmatrix} 1 & e & f \\ 0 & b & b-1 \\ 0 & 1 & 1 \end{bmatrix},$$

where $$\det(M) = 1,$$

$$P' = (x', y', z'),$$

$$P' = M*P,$$

$$P' = (x+e*y+f*z, b*y+(b-1)*z, y+z) = (x', y', z').$$

The inverse transformation of point P', which results in the point P, can be calculated as:

$$P = (x'-(e+f*b)*y' + (e*(b-1)+f)*z', y'-(b-1)*z', b*y'-z')$$

$$= (x, y, z).$$

In this implementation, e, f, and b can be constants that can be random numbers, or numbers selected to simplify the matrix multiplication.

In some implementations, the elliptic curve point transformation process 200 can be performed on an elliptic curve represented in projective coordinates. In this implementation, the linear transformation matrix can be a 3×3 square matrix. For example, a point P can have the coordinates (x, y, z) on an elliptic curve on a prime field ($F_p$). A linear transformation matrix, M, can be:

$$M = \begin{bmatrix} b & b-1 & 0 \\ 1 & 1 & 0 \\ h & h & 1 \end{bmatrix}.$$

In this implementation, a number, a, can be used as a constant, a function of random values, or it can be used as available data in the point operation. In this implementation, a number, b, can also be used as a constant, a function of random values, or it can be used as available data in the point operation. Note that the variable h can have the same values as b: a constant, a function of a random value, data available in the point operations, etc. A ChangeRepresentative( ) function can be used to change the representation of the point, P, to the point, P'. As described previously, a point P can be represented with powers c and d that can define an equivalence class. In this implementation, the following equations can be used.

$$\det(M) = 1,$$

$$P' = (x', y', z'),$$

$$P' = M*ChangeRepresentative(P),$$

$$P' = ((a^c)*b*x + (a^d)*(b-1)*y, (a^c)*x + (a^d)*y, h*(a^c)*x + h*(a^d)*y + a*z)$$

$$= (x', y', z').$$

The inverse transformation of point P' can be calculated as:

$$ChangeRepresentative(P)=(x'-(b-1)*y', b*y'-x', z'-h*y')=(x, y, z).$$

In this implementation, the ChangeRepresentative( ) function may not modify the operation on points coordinates so a modified operation on points coordinates can take into account only the linear transformation matrix.

In an example of the above implementation, a point operation can be a point addition of points represented in projective coordinates (e.g., Jacobian projective coordinates where c=2 and d=3). The point addition operation can be the addition of a point P and a point Q which results in a point R, where points P, Q, and R are points on an elliptic curve on a prime field ($F_p$).

$$P=(x1, y1, z1),$$

$$Q=(x2, y2, z2),$$

$$R=(x3, y3, z3)=P+Q.$$

Point, P, can be transformed using a matrix, M, as described above, into point P', where $$M = \begin{bmatrix} b & b-1 & 0 \\ 1 & 1 & 0 \\ h & h & 1 \end{bmatrix},$$

$$P' = (x1', y1, z1') = M*P.$$

The operation on point coordinates can result in:

$$A=x1*z2^2,$$

$$C=y1*z2^3,$$

$$E=x2*z1^2-A,$$

$$F=y3*z1^3-C,$$

$$x3=-E^3-2*A*E^2+F^2,$$

$$y3=-C*E^3+F*(A*E^2-x3),$$

$$z3=z1*z2*E.$$

The modified operation on points coordinates can result in:

$$A=(x1'-(b-1)*y1')*z2^2,$$

$$C=(b*y1'-x1')*z2^3,$$

$$E=x2*(z1'-h*y1')^2-A,$$

$$F=y3*(z1'-h*y1')^3-C,$$

$$x3=-E^3-2*A*E^2+F^2,$$

$$y3=-C*E^3+F*(A*E^2-x3),$$

$$z3=z1*z2*E.$$

In this example, a modified operation on point coordinates may be implemented so that the values $(x1=x1'-(b-1)*y1')$ and $(y1=b*y1'-x1')$ are not calculated during the point addition operation. In the example above, the point addition operation can also be performed using the equations below.

$$A=x1'*z2^2-(b-1)*y1'*z2^2,$$

$$C=b*y1'*z2^3-x1'*z2^3,$$

$$E=x2*z1'^2-x2*2*h*y1'-x2*h*y1^2-A,$$

$$F=y2*z1'^3-y2*3*z1'^2*h*y1'+y2*3*z1*h^2*y1'^2-y2*h^3*y1'^3-C,$$

$$x3=-E^3-2*A*E^2+F^2,$$

$$y3=-C*E^3+F*(A*E^2-x3),$$

$$z3=z1*z2*E.$$

In this example, the output can be transformed with the same matrix and ChangeRepresentative( ) function as in the previous example, but can result in different coordinates for x3', y3', and z3', the transformed point.

Referring again to FIG. 2, the elliptic curve point transformation process 200 can begin by obtaining the input that can specify the point coordinates for the point operation to be performed (step 202). For example, a point doubling operation can add a point to itself using a point doubling operation that includes a single point and its coordinates as input. In another example, two different points can be added together using a point addition operation that includes two points and their coordinates for inputs. As was described above, the input point(s) can be in affine coordinates, projective coordinates, or redundant coordinates on an elliptic curve. The elliptic curve can be on a prime field $(F_p)$, a binary field $(F_2^m)$, or an extension field $(F_p^m)$.

The input point(s) can be transformed by an operation on point coordinates by applying an elliptic curve point transformation (elliptic curve (EC) point transformation) to the input point(s) (step 204). In the examples given above, the input point, P, was transformed to the point, P'.

A modified operations on points coordinates can be performed on the transformed input point(s) (step 206). This was shown in the examples above, where the values of m, x3, and y3 are determined. An example of a modified operation on points coordinates can be point addition that uses the transformed point or points. Next, the point coordinates obtained from the modified operations on points coordinates can be output for use in, for example, other point operations (step 208). For example, the point coordinate values x3, and y3 can be output and incorporated into subsequent point operations.

Elliptic Curve Encryption Process Using Point Transformations

Figure 3A:
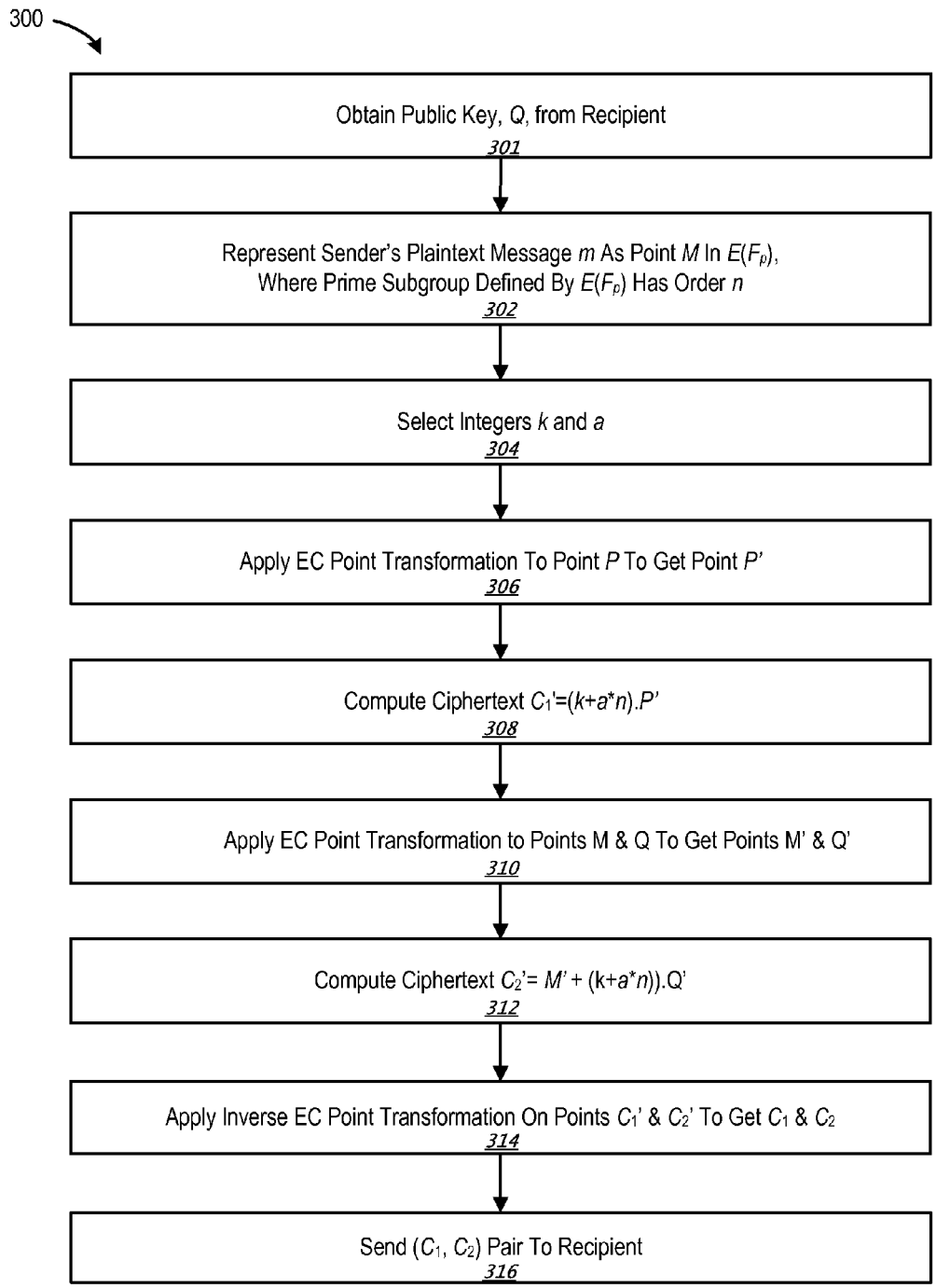
FIG. 3A is a flow diagram of an implementation of an elliptic curve encryption process using point transformations.

FIG. 3A is a flow diagram of an implementation of an elliptic curve encryption process 300 using point transformations. The process 300 makes use of techniques described in U.S. patent application Ser. No. 11/777,186, for "Masking and Additive Decomposition Techniques for Cryptographic Field Operations," filed Jul. 12, 2007, which patent application is incorporated by reference herein in its entirety.

The process 300 begins with a sender obtaining a public key, Q, from a recipient over an authenticated channel between the sender and the recipient (step 301). The sender can represent its plaintext message m as a point M on an elliptic curve, E, which can be defined over a finite prime field, $F_p$, for example, where p is a prime number. The set of all points on the elliptic curve E can be denoted as $E(F_p)$, which defines a prime subgroup of order n (step 302). The sender can then select a random number k from the interval [1, (n−1)] (step 304). The sender can also select a random number, a, where a is greater than or equal to 1 (step 304) The random number a can be referred to as a masking parameter.

The input point, P, in a first coordinate system can be transformed to a point, P', in a second coordinate system by applying an elliptic curve (EC) point transformation to the point, P (step 306). The sender can then compute ciphertext point $C_1$' (step 308) using the following equation:

$$C_1'=(k+a*n)\cdot P',$$

where k is a random number selected by the sender from the interval [1, (n−1)] and the exponent value, a is a random number greater than or equal to 1 and the masking parameter, P' is a transformed point in $E(F_p)$ and n is the order of the prime subgroup defined by $E(F_p)$.

The point M and the public key Q can be transformed by applying an elliptic curve point transformation to each point, M and Q, to get points M' and Q' (step 310). The transformation to the points M' and Q' can be performed in a similar manner as the transformation to the point, P', in the previous examples.

The sender can compute ciphertext point $C_2$' (step 312) using the following equation:

$$C_2'=M'+(k+a*n)\cdot Q',$$

where n is the order of the prime subgroup defined by $E(F_p)$, M' is the transformed point representation of the plaintext message m and Q' is the transformed point representation of the public key of the recipient.

An inverse elliptic curve transformation can be applied to points $C_1$' and $C_2$' to get the ciphertext pair of points $C_1$ and $C_2$ (step 314).

The sender can transmit the ciphertext pair of points ($C_1$, $C_2$) to the recipient (step 316) over an unsecured channel between the sender and the recipient. The process 300 ends.

The implementation of FIG. 3A may be used with points represented in affine coordinates, projective coordinates, and redundant coordinates. The implementation of FIG. 3A may also be used with elliptic curves on a prime field $(F_p)$, a binary field $(F_2m)$, or an extension field $(F_p^m)$. Point transformations can be performed using the point representations on any of the elliptic curves using the implementations and examples described herein.

Elliptic Curve Decryption Process

Figure 3B:
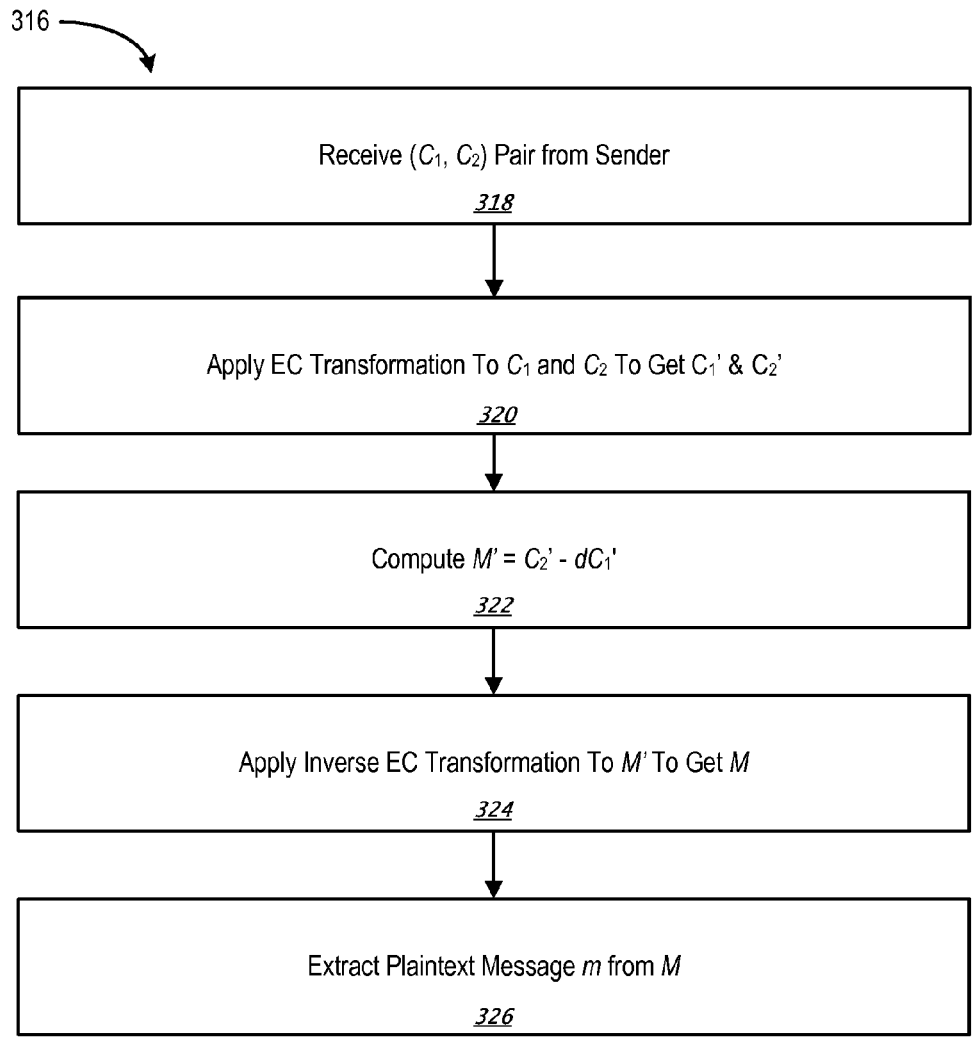
FIG. 3B is a flow diagram of an implementation of an elliptic curve decryption process using point transformations.

FIG. 3B is a flow diagram of an implementation of an elliptic curve decryption process 316 using point transformations. The process 316 can be used as the decryption process for use with the elliptic curve encryption process 300.

The process 316 begins when the recipient receives the ciphertext pair of points ($C_1$, $C_2$) from the sender over an unsecured channel between the recipient and the sender (step 318). The recipient then applies an elliptic curve transformation to $C_1$ and $C_2$ to get $C_1'$ and $C_2'$ (step 320). The recipient then computes the transformed point representation, M', of a plaintext message (step 322) using the following equation:

$$M' = C_2' - d \cdot C_1',$$

where M' is the transformed point representation of the plaintext message m and d is the private key of the recipient device.

The recipient, knowing the transformed point representation of the plaintext message m, can apply the inverse transformation to M' to get M (step 324). This process is equivalent to the inverse transformations that were described above for point P'. Knowing M, the recipient can then extract the plaintext message m from its point representation, M (step 326). The process 316 ends.

The foregoing processes implement point transformations in an ECC system. Other processes are possible, including processes with more or fewer steps (e.g., a digital signature generation and/or authentication process). The steps of the processes need not be performed serially in the order shown. The processes can be divided into multiple processing threads run by one or more processor cores and/or parallel processors.

System Architecture

Figure 4:
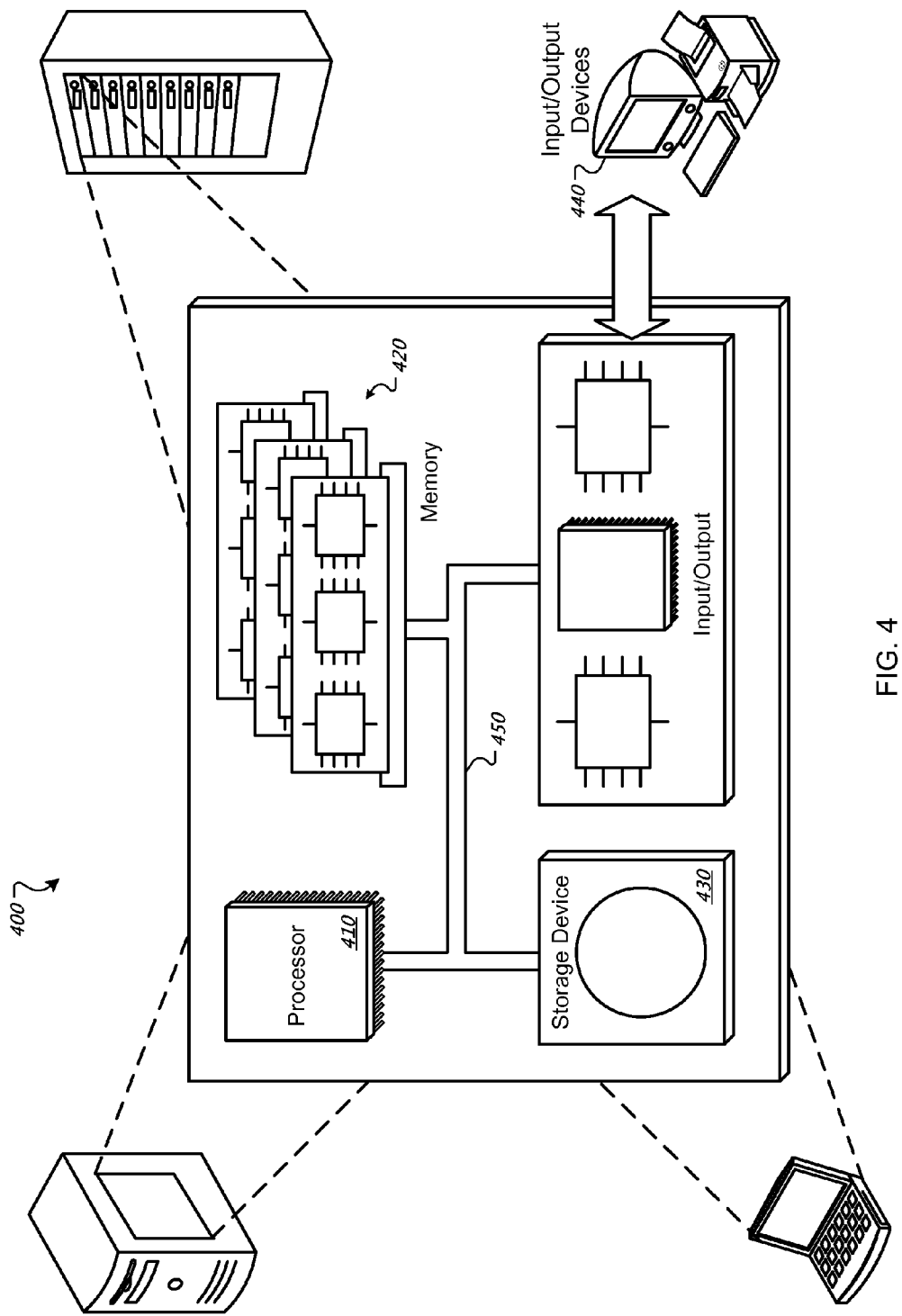
FIG. 4 is a block diagram of an implementation of a system for implementing the processes of FIGS. 2, 3A and 3B.

FIG. 4 is a block diagram of an implementation of a system for implementing the processes of FIGS. 2, 3A, and 3B. For example, the system 400 may be included in device 102 and/or in device 104, described in reference to FIG. 1. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In some implementations, the processor 410 is a single-threaded processor. In another implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In another implementations, the memory 420 is a volatile memory unit. In yet another implementations, the memory 420 is a non-volatile memory unit.

The storage device 430 is capable of providing mass storage for the system 400. In some implementations, the storage device 430 is a computer-readable medium. In various different implementations, the storage device 430 may be a floppy disk device, a hard disk device, an optical disk device, or a tape device.

The input/output device 440 provides input/output operations for the system 400. In some implementations, the input/output device 440 includes a keyboard and/or pointing device. In other implementations, the input/output device 440 includes a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method performed by a system including a processor and memory, the method comprising:
    obtaining a point on an elliptic curve specified by n point coordinates for a first elliptic curve coordinate system, wherein n is greater than or equal to two;
    transforming, using the processor, the point from the first elliptic curve coordinate system to a transformed point in a second elliptic curve coordinate system, including performing a linear matrix transformation on the point coordinates using an n row by n column square linear matrix having n*n coefficients, where the linear matrix is invertible; and
    performing one or more modified field operations on the transformed point, wherein the modified field operations are modified from one or more initial field operations for the first elliptic curve coordinate system for use in the second elliptic curve coordinate system based on an inverse matrix of the linear matrix.

2. The method of claim 1, where the second elliptic curve coordinate system has more dimensions than the first elliptic curve coordinate system.

3. The method of claim 1, where the linear matrix includes at least one coefficient that is a variable or random.

4. The method of claim 1, where the method is used in an elliptic curve encryption or decryption operation.

5. The method of claim 1, where the method is used in an elliptic curve digital signature generation or verification operation.

6. A method performed by a system including a processor and memory, the method comprising:
    obtaining a point on an elliptic curve specified by n point coordinates for a first elliptic curve coordinate system, wherein n is greater than or equal to two;
    transforming, using the processor, the point from the first elliptic curve coordinate system to a transformed point in a second elliptic curve coordinate system, including performing a linear matrix transformation on the point using an n row by n column square linear matrix having n*n coefficients, where the linear matrix is invertible; and
    generating ciphertext or a digital signature using the transformed point in combination with at least one modified field operation, the modified field operation being modified from one or more initial field operations for the first elliptic curve coordinate system for use in the second elliptic curve coordinate system based on an inverse matrix of the linear matrix.

7. The method of claim 6, where
    the linear matrix includes at least one coefficient that is a variable or random.

8. A method performed by a system including a processor and memory, the method comprising:
    obtaining ciphertext generated using a point on an elliptic curve specified by n point coordinates for a first elliptic curve coordinate system, wherein n is greater than or equal to two;
    obtaining the point from the ciphertext;
    transforming, using the processor, the point from the first elliptic curve coordinate system to a transformed point in a second elliptic curve coordinate system, including performing a linear matrix transformation on the point using an n row by n column square linear matrix having n*n coefficients, where the linear matrix is invertible; and
    generating a plaintext message using the transformed point in combination with at least one modified field operation, the modified field operations being modified from one or more initial field operations for the first elliptic curve coordinate system for use in the second elliptic curve coordinate system based on an inverse matrix of the linear matrix.

9. The method of claim 8, where
    the linear matrix includes at least one coefficient that is a variable or random.

10. A method performed by a system including a processor and memory, the method comprising:
    obtaining a digital signature, the digital signature generated using a point on an elliptic curve specified by n point coordinates for a first elliptic curve coordinate system, wherein n is greater than or equal to two;
    obtaining the point from the digital signature;
    transforming, using the processor, the point from the first elliptic curve coordinate system to a transformed point in a second elliptic curve coordinate system, including performing a linear matrix transformation on the point using an n row by n column square linear matrix having n*n coefficients, where the linear matrix is invertible; and
    authenticating the digital signature using the transformed point in combination with at least one modified field operation, wherein the modified field operation is modified from one or more initial field operations for the first elliptic curve coordinate system for use in the second elliptic curve coordinate system based on an inverse matrix of the linear matrix.

11. An apparatus comprising:
    a processor and a memory;
    an interface operable for obtaining one or more point coordinates a point on an elliptic curve specified by n point coordinates for a first elliptic curve coordinate system, wherein n is greater than or equal to two; and
    an encryption engine coupled to the interface and operable for:
        transforming the point from the first elliptic curve coordinate system to a transformed point in a second elliptic curve coordinate system, including performing a linear matrix transformation on the point using an n row by n column square linear matrix having n*n coefficients, where the linear matrix is invertible, and
        performing one or more modified field operations on the transformed point coordinate, wherein the modified field operation is modified from one or more initial field operations for the first elliptic curve coordinate system for use in the second elliptic curve coordinate system based on an inverse matrix of the linear matrix.

12. The apparatus of claim 11, where the second elliptic curve coordinate system has more dimensions than the first elliptic curve coordinate system.

13. The apparatus of claim 11, where the linear matrix includes at least one coefficient that is a variable or random.

14. The apparatus of claim 11, where the transforming is part of an elliptic curve encryption or decryption operation.

15. The apparatus of claim 11, where the transforming is part of an elliptic curve digital signature generation or verification operation.

16. An apparatus comprising:
a processor and a memory;
an interface operable for obtaining a point on an elliptic curve specified by n point coordinates for a first elliptic curve coordinate system, wherein n is greater than or equal to two;
an encryption engine coupled to the interface and operable for:
transforming the point from the first elliptic curve coordinate system to a transformed point in a second elliptic curve coordinate system, including performing a linear matrix transformation on the point using an n row by n column square linear matrix having n*n coefficients, where the linear matrix is invertible, and
generating ciphertext or a digital signature using the transformed point in combination with at least one modified field operation, wherein the modified field operation is modified from one or more initial field operations for the first elliptic curve coordinate system for use in the second elliptic curve coordinate system based on an inverse matrix of the linear matrix.

17. The apparatus of claim 16, where
the linear matrix includes at least one coefficient that is a variable or random.

18. An apparatus comprising:
a processor and a memory;
an interface operable for obtaining ciphertext generated using a point on an elliptic curve specified by n point coordinates for a first elliptic curve coordinate system, wherein n is greater than or equal to two; and
a decryption engine coupled to the interface and operable for:
obtaining the point from the ciphertext, and transforming the point from the first elliptic curve coordinate system to a transformed point in a second elliptic curve coordinate system, including performing a linear matrix transformation on the point using an n row by n column square linear matrix having n*n coefficients, where the linear matrix is invertible, and
generating a plaintext message using the transformed point in combination with at least one modified field operation, wherein the modified field operation is modified from one or more initial field operations for the first elliptic curve coordinate system for use in the second elliptic curve coordinate system based on an inverse matrix of the linear matrix.

19. The apparatus of claim 18, where
the linear matrix includes at least one coefficient that is a variable or random.

20. An apparatus comprising:
a processor and a memory;
an interface operable for obtaining a digital signature, the digital signature generated using a point on an elliptic curve specified by n point coordinates for a first elliptic curve coordinate system, wherein n is greater than or equal to two; and
a decryption engine coupled to the interface and operable for:
obtaining the point from the digital signature, and transforming the point from the first elliptic curve coordinate system to a transformed point in a second elliptic curve coordinate system, including performing a linear matrix transformation on the point using an n row by n column square linear matrix having n*n coefficients, where the linear matrix is invertible, and
authenticating the digital signature using the transformed point in combination with at least one modified field operation, wherein the modified field operation is modified from one or more initial field operations for the first elliptic curve coordinate system for use in the second elliptic curve coordinate system based on an inverse matrix of the linear matrix.

21. A non-transitory computer-readable storage device having instructions stored thereon, which, when executed by a processor, causes the processor to perform operations comprising:
obtaining input specifying one or more point coordinates a point on an elliptic curve specified by n point coordinates for a first elliptic curve coordinate system, wherein n is greater than or equal to two;
transforming the point from the first elliptic curve coordinate system to a transformed point in second elliptic curve coordinate system, including performing a linear matrix transformation on the at least one point using an n row by n column square linear matrix having n*n coefficients, where the matrix is invertible; and
performing one or more modified field arithmetic operations on the transformed point, wherein the modified field arithmetic operations are modified from one or more initial field operations for the first elliptic curve coordinate system for use in the second elliptic curve coordinate system based on an inverse matrix of the linear matrix.

* * * * *